US008873395B1

(12) United States Patent
Prock et al.

(10) Patent No.: US 8,873,395 B1
(45) Date of Patent: Oct. 28, 2014

(54) METHODS AND SYSTEMS FOR DYNAMICALLY VARYING QUALITY OF SERVICE FOR WIRELESS COMMUNICATIONS

(71) Applicant: Sprint Spectrum L.P., Overland Park, KS (US)

(72) Inventors: John W. Prock, Raymore, MO (US);
Kurt M. Landuyt, Parkville, MO (US);
Louie E. Wingo, Liberty, MO (US);
Kevin L. Butler, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 89 days.

(21) Appl. No.: 13/747,650

(22) Filed: Jan. 23, 2013

(51) Int. Cl.
| | |
|---|---|
| *H04L 12/26* | (2006.01) |
| *H04W 28/02* | (2009.01) |
| *H04W 72/08* | (2009.01) |
| *H04W 72/10* | (2009.01) |

(52) U.S. Cl.
CPC ........ *H04W 28/0268* (2013.01); *H04W 72/087* (2013.01); *H04W 72/10* (2013.01)
USPC .......................... 370/235; 370/329; 455/452.2

(58) Field of Classification Search
CPC .............. H04W 72/087; H04W 72/10; H04W 28/0268; H04W 76/02; H04W 76/007; H04W 4/22; H04L 49/90
USPC ......... 370/235–395.2; 455/435.3, 436, 452.2, 455/509, 512, 514
See application file for complete search history.

(56) References Cited

U.S. PATENT DOCUMENTS

| | | | | |
|---|---|---|---|---|
| 6,570,844 | B1 * | 5/2003 | Deschaine | 370/217 |
| 7,565,161 | B2 * | 7/2009 | Sliva | 455/512 |
| 7,664,867 | B2 * | 2/2010 | Lockhart, Jr. | 709/230 |
| 8,599,703 | B2 * | 12/2013 | Dhillon et al. | 370/248 |
| 8,750,198 | B2 * | 6/2014 | Cho et al. | 370/315 |
| 2005/0250509 | A1 * | 11/2005 | Choksi | 455/452.1 |
| 2006/0176813 | A1 * | 8/2006 | Santhanankrishnan | 370/230 |
| 2009/0046667 | A1 * | 2/2009 | Pelletier et al. | 370/335 |
| 2012/0307770 | A1 * | 12/2012 | Kubota | 370/329 |
| 2013/0242732 | A1 * | 9/2013 | Ho et al. | 370/230 |
| 2014/0141794 | A1 * | 5/2014 | Smith et al. | 455/454 |

OTHER PUBLICATIONS

Crowe, David, Cellular Networking Perspectives, IS-41: The magic glue for the cellular network, May 1997, 2 pages.

(Continued)

*Primary Examiner* — Afsar M Qureshi

(57) ABSTRACT

Quality of Service (QoS) priority values and thresholds are defined for various service types assignable to user equipment (UE devices) including multiple bandclass devices. The QoS thresholds can be used for determining whether resources of a default or alternate bandclass should be used for a new call request or whether a timer should be initiated to wait for additional resources to become available. A default QoS priority values can be assigned to each service type and used for voice calls requested by UE devices. QoS priority values with lower priority can be used for data calls. The priority of priority values can decrease as the data rate for the data calls increases. Thresholds for blocking call requests can be increased or decreased to improve likelihood that resources for call requests with higher priority service types are granted at the expense granting resources for call requests with lower priority service types.

19 Claims, 5 Drawing Sheets

(56) References Cited

OTHER PUBLICATIONS

LG Space, CDMA2000 channel calculator, downloaded from the world wide web at http://nivuk.free.fr/cdma_band.php on Dec. 26, 2012, 6 pages.

Priscoli, F.D., Fixed and adaptive blocking thresholds in CDMA cellular networks, abstract as listed at IEEE Xplore digital library, 1995, 2 pages.

* cited by examiner

METHODS AND SYSTEMS FOR DYNAMICALLY VARYING QUALITY OF SERVICE FOR WIRELESS COMMUNICATIONS

BACKGROUND

Unless otherwise indicated herein, the elements described in this section are not prior art to the claims and are not admitted to be prior art by inclusion in this section.

User equipment (UE) devices, such as cell phones and wireless personal digital assistants (PDAs), are operable to communicate with radio access networks, such as cellular wireless networks. These UE devices and access networks typically communicate with each other over a radio frequency (RF) air interface according to a wireless protocol such as 1x Evolution Data Optimized (1x Ev-DO), perhaps in conformance with one or more industry specifications such as IS-856, Revision 0, IS-856, Revision A, and IS-856, Revision B. Other wireless protocols may be used as well, such as Code Division Multiple Access (CDMA), Global System for Mobile Communications (GSM), Time Division Multiple Access (TDMA), or some other wireless protocol.

Access networks typically provide services such as voice, text messaging (such as Short Message Service (SMS) messaging), and packet-data calls, among others. Access networks typically include a plurality of base transceiver stations (BTSs), each of which provides one or more coverage areas, such as cells and sectors (i.e., individual areas of a cell that allow the cell to carry more calls). When a UE device is positioned in one of these coverage areas, it can communicate over the air interface with the BTS, and in turn over a signaling network or a transport network, or both. The signaling network may be a circuit-switched network, a packet-switched network or a combination of both. Similarly, the transport network may be a circuit-switched network, a packet-switched network or a combination of both.

UE devices and access networks may conduct calls (e.g. voice calls and data calls) over a pair of frequencies known as carriers, with a BTS of an access network transmitting to a UE device on one of the frequencies, and the UE device transmitting to the BTS on the other. This is known as frequency division duplex (FDD). A BTS-to-UE-device communication link is known as the forward-link, while a UE-device-to-BTS communication link is known as the reverse-link.

UE devices may be configured with a particular radio configuration (RC) from among a plurality of RCs defined for a wireless protocol. Each RC can define a combination of forward and reverse traffic channel transmission formats based on, for example, data transmission rates, error-correction codes, modulation characteristics, and spreading factors. The RCs can, for example, be identified as RCX, where X is a positive integer.

UE devices may be mobile such that the UE devices can be transported between different coverage areas while the UE devices are operating in an idle mode (e.g., a mode in which the UE devices are not carrying out calls) or an active mode (e.g., a mode in which the UE devices are carrying out calls). A given coverage area provided by an access network may reach a capacity for carrying out calls if too many UE devices are carrying out and/or are trying to carry out calls while in the given coverage area. An access network may be arranged to compensate for coverage areas operating at their capacity.

OVERVIEW

This application describes several example embodiments, at least some of which pertain to determining a QoS priority value for a UE device and a blocking threshold associated with the determined QoS priority value, starting a buffer timer if a blocking threshold determined for a new call request with the UE device is exceeded, and then blocking the new call request if the new call is not granted prior to expiration of the buffer timer or granting the new call if the QoS for the UE device goes below the blocking threshold and granting the new call request will cause less impact to QoS provided by a BTS relative to granting another call request pending for another UE device. UE devices can be associated with default QoS priority values, but the QoS priority value determined for a given new call request with the UE device can be other than the default QoS priority value based on the characteristics of the new call request, such as a data rate requested for the new call.

In one respect, an example embodiment can take the form of a method comprising (i) receiving, using a wireless serving system (WSS), a call request for a UE device served by the WSS, (ii) determining, using the WSS, that resources to assign to the UE device to grant the call request are unavailable, (iii) determining, using the WSS, a QoS priority value for the call request, (iv) selecting, using the WSS based on the QoS priority value, a first maximum wait time the WSS will wait before blocking the call request if resources to assign to the UE device to grant the call request remain unavailable during the first maximum wait time, and (v) provisioning, using the WSS, resources to the UE device to grant the call request if resources to grant the call request become available prior to the WSS waiting the first maximum wait time after receiving the call request, otherwise, if resources to grant the call request are not available prior to the WSS waiting the first maximum wait time after receiving the call request, then the WSS blocking the call request.

In another respect, an example embodiment can take the form of a device of a WSS, the device comprising: a communication interface arranged to receive a call request for a UE served by the WSS, a processor, and a computer-readable data storage device comprising computer-readable program instructions executable by the processor. The computer-readable program instructions comprise program instructions executable to (i) determine that resources to assign to the UE device to grant the call request are unavailable, (ii) determine a first QoS priority value for the call request, (iii) select, based on the first QoS priority value, a first maximum wait time the device will wait before blocking the call request if resources to assign to the UE device to grant the call request remain unavailable during the first maximum wait time, and (iv) provision resources to the UE device to grant the call request if resources to grant the call request become available prior to the device waiting the first maximum wait time after receiving the call request, otherwise, if resources to grant the call request are not available prior to the device waiting the first maximum wait time after receiving the call request, then the device blocking the call request.

In yet another respect, an example embodiment can take the form of a method comprising: (i) determining, using a WSS, a first new call for a multi-band UE device using a first band class is requested, (ii) selecting, using the WSS, a first QoS load threshold and a first QoS blocking threshold to use with respect to assigning or blocking the first new call, (iii) determining, using the WSS, whether a loading of the first band class exceeds the first QoS load threshold, wherein if the WSS determines the loading of the first band class does not exceed the first QoS load threshold, then assigning the first new call to the first band class, (iv) determining, using the WSS if the WSS determines the loading of the first band class exceeds the first QoS load threshold, whether a second band class usable by the UE device is available for carrying out the first new call, wherein if the WSS determines the second band class is available for carrying out the first new call, then assigning the first new call to the second band class, (v) determining, using the WSS if the WSS determines the second band class is not available for carrying out the first new call, whether the loading of the first band class exceeds the first QoS blocking threshold, wherein if the WSS determines the loading of the first band class does not exceed the first QoS blocking threshold, then assigning the first new call to the first band class, (vi) starting, using the WSS if the WSS determines the loading of the first band class exceeds the first QoS blocking threshold, a buffer timer, and (vii) blocking, using the WSS, the first new call if the buffer timer expires prior to the WSS assigning the first new call to the first band class or the second band class.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which.

DETAILED DESCRIPTION

I. Introduction

As mentioned above, this description describes several example embodiments. Within this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. The ordinal numbers can be written in the form of $1^{st}$, $2^{nd}$, $3^{rd}$ and so on.

The diagrams and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (for example, machines, interfaces, functions, orders, or groupings of functions) can be used instead. Furthermore, various functions described as being performed by one or more elements can be carried out by a processor executing computer-readable program instructions or by any combination of hardware, firmware, or software.

II. Example Architecture

Figure 1:
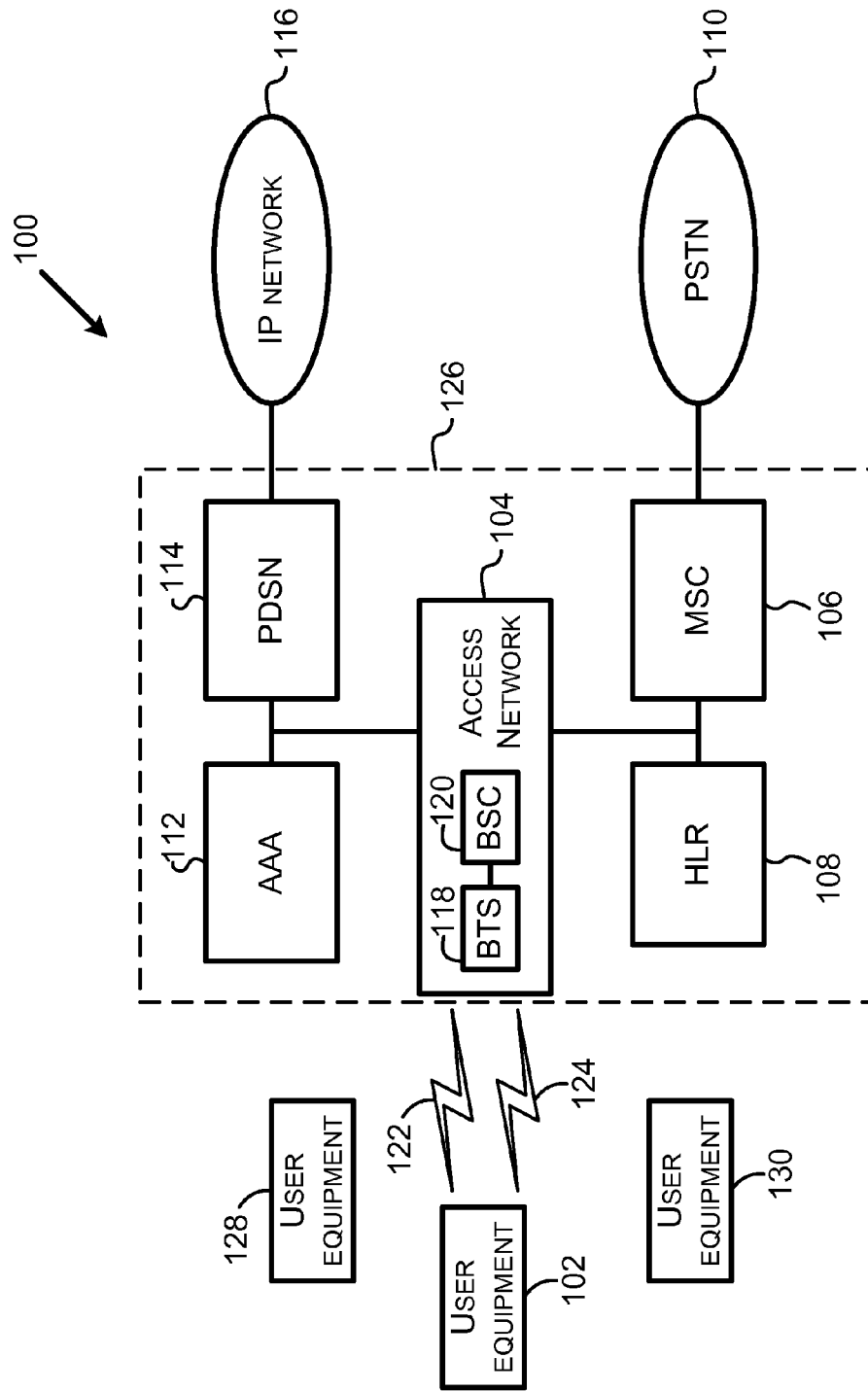
FIG. 1 is a block diagram of a communication network in accordance with one or more example embodiments described herein.

FIG. 1 is a block diagram of a communication network 100 in accordance with one or more example embodiments described herein. Communication network 100 includes a user equipment (UE) device 102, an access network 104, a mobile switching center (MSC) 106, a home location register (HLR) 108, a public switched telephone network (PSTN) 110, an authentication, authorization, and accounting (AAA) device 112, a packet data serving node (PDSN) 114, an internet protocol (IP) network 116, and UE devices 128 and 130.

Communication network 100 includes a wireless serving system (WSS) 126. A wireless service provider, such as the Sprint Nextel Corporation, can operate some or all of wireless serving system 126. WSS 126 can connect or provide means for UE device 102 to connect to another network, such as PSTN 110 or IP network 116. As shown in FIG. 1, WSS 126 includes access network 104, MSC 106, HLR 108, AAA device 112 and PDSN 114. WSS 126 can be arranged in other configurations, such as a configuration not including at least one element of WSS 126 shown in FIG. 1 or a configuration that includes one or more other elements of a WSS.

Access network 104 includes a base transceiver station (BTS) 118 and a base station controller (BSC) 120. Access network 104 can provide wireless service using multiple RF bands. Each RF band can be referred to as a band class. Access network 104 can comprise one or more additional BSC. Each BSC of access network 104 can control one or more BTS. One or more BTS within access network 104 can be co-located with the BSC that controls those BTS.

UE device 102 is configured to communicate wirelessly using access network 104. UE device 102 can be referred to as UE, user equipment, access device, or by another term. UE device 102 can comprise or be arranged as a cellular phone, a mobile station, or a personal digital assistant (PDA). UE device 102 can be configured as a multi-band (for example, a dual-band or tri-band) UE device. Each band of the multi-bands can be referred to as a bandclass (BC) and can be defined as a set of frequency channels.

For purposes of this description, UE device 102 is considered to be a dual-band UE device configured to operate using two code division multiple access (CDMA) band classes, namely, (i) a 1,900 megahertz (MHz) band referred to as band class 1 (BC1) that uses transmit frequency channels within a frequency range of about 1,850 MHz to about 1,990 MHz, and (ii) an 800 MHz band referred to as band class 10 (BC10) that uses transmit frequency channels with a frequency range of about 806 MHz to about 940 MHz. Each band class can be considered a separate air interface. The air interfaces of BC1 and BC10 are shown in FIG. 1 as air interfaces 122 and 124. Other examples of band classes UE device 102 can be arranged to use are also possible. UE devices 128 and 130 can be configured like UE device 102. For clarity of FIG. 1, the air interfaces for UE devices 128 and 130 are not shown.

Access network 104 can be configured as a single-band access network or a multi-band access network. A single-band access network can serve UE device 102 using a single band class that the access network supports, whereas a multi-band access network can serve UE device 102 via one or more of a plurality of band classes that the access network supports. Each band class can, for example, be defined with respect to a frequency, a frequency range, a wireless communication protocol, a data type communicated over the band class, or some other band class characteristic. BTS 118 can have separate antennas and transceivers for each band class supported by access network 104.

HLR 108 is a database or record of UE device (subscriber) information. As an example HLR 108 can comprise account information, account status, user preferences, UE device features, and UE device current location. MSC 120 can use data stored in HLR 108 to originate and deliver calls for UE device 102. When provisioning WSS 126 for each customer and the UE device(s) used by that customer, HLR 108 can be configured to include customer-type categories. After configuring HLR 108 to include customer-type categories, additional categories can be provided to HLR 108 during customer registration. Various messages pertaining to registration, such as an IS-41 QualDir Invoke message, a QualDir Response message, and a RegNot Response message, can be configured to include calling feature indicators. Those messages can include the following information (in hex) within an octet referred to as octet 8.

nents of WSS 126 can be arranged like WSS device 200 or include at least one component of WSS device 200. In other words, one or more of BTS 118, BSC 120, and HLR 108 can be arranged like WSS device 200 or include at least one component of WSS device 200. In another respect, one or more components of WSS device 200 can be distributed among the components of WSS 126. Accordingly, functions described as being carried out by WSS 126 or by WSS device 200 can be carried out by BTS 118, BSC 120 or HLR 108 or by components within BTS 118, BSC 120, or HLR 108.

Processor 202 can comprise one or more general purpose processors (for example, INTEL single core microprocessors or INTEL multicore microprocessors) or one or more special purpose processors (for example, application specific integrated circuits (ASICs) or digital signal processors (DSPs)). Processor 202 can execute computer-readable program instructions, such as computer-readable program instructions (CRPI) 210.

Communication interface 204 can comprise a transmitter to transmit (and a receiver to receive) communications such as signaling and bearer communications to or from another device of WSS 126 or a network that connects to WSS 126 or to another component of WSS device 200. The transmitter

TABLE 1

| QoS Octet (Hex) | Provisioned User Equipment Device (Handset) Type |
| --- | --- |
| 00 | Non-dual band handset |
| 01 | Post-paid Simultaneous Voice and LTE (SV-LTE), highest priority (1) |
| 02 | Post-paid SV-LTE, medium priority (2) |
| 03 | Post-paid SV-LTE, low priority (3) |
| 04 | Post-paid Non-SV-LTE, highest priority (1) |
| 05 | Post-paid Non-SV-LTE, medium priority (2) |
| 06 | Post-paid Non-SV-LTE, low priority (3) |
| 07 | Post-paid Machine-to-Machine (M to M), higher priority (1) |
| 08 | Post-paid Machine-to-Machine (M to M), lower priority (2) |
| 09 | Pre-paid Machine-to-Machine (M to M) |
| 0A | Pre-paid SV-LTE, higher priority (1) |
| 0B | Pre-paid SV-LTE, lower priority (2) |
| 0C | Pre-paid, non-SV-LTE, higher priority (1) |
| 0D | Pre-paid, non-SV-LTE, lower priority (2) |
| 0E | Wholesale, higher priority (1) |
| 0F | Wholesale, lower priority (2) |
| 10 to FF | Reserved |

For purposes of this description, access network 104 supports the two band classes used by UE device 102. As indicated above, those two band classes are band class 1 (BC1) and band class 10 (BC10). Other examples of band classes that access network 104 can support are also possible.

MSC 106 is a switch for at least some of the calls occurring via communication network 100. MSC 106 interfaces to PSTN 110 to connect calls between UE devices operating within coverage areas provided by access network 104 and devices connected to PSTN 110. MSC 106 can provide switching for multiple BSCs and the BTSs.

AAA device 112 can comprise a server that handles call requests for access to IP functionality via IP network 116. AAA device 112 can interface to PDSN 114, which is a gateway providing simple IP and mobile IP access and connectivity to IP network 116. IP network 116 can include the Internet.

Figure 2:
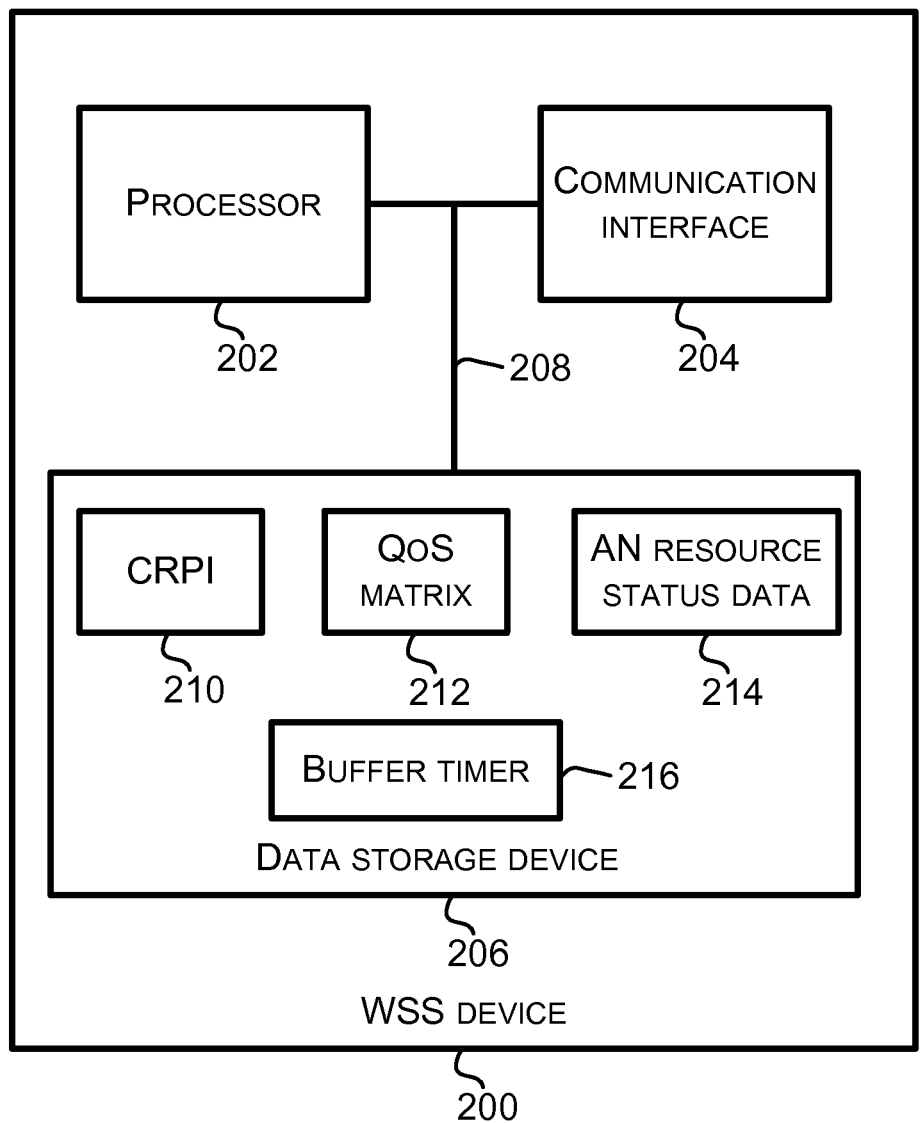
FIG. 2 is a block diagram of an example wireless serving system (WSS) in accordance with one or more example embodiments described herein.

Next, FIG. 2 is a block diagram showing a wireless serving system (WSS) device 200 and components of WSS device 200 in accordance with one or more example embodiments. WSS device 200 includes a processor 202, a communication interface 204, and a data storage device 206, all of which can be linked together via a system bus, network, or other connection mechanism 208. In one respect, one or more compoand receiver can be separate or combined into a transceiver. Communication interface 204 can receive call requests from UE device 102 and handle communications of calls carried out using UE device 102.

Data storage device 206 can comprise a non-transitory computer-readable storage medium readable by processor 202. The computer-readable storage medium can comprise volatile and/or non-volatile storage components, such as optical, magnetic, organic or other memory or disc storage, which can be integrated in whole or in part with processor 202. Data storage device 206 may also or alternatively be provided separately, as a non-transitory machine readable medium.

Data storage device 206 can include CRPI 210, a quality of service (QoS) matrix 212, access network (AN) resource status data 214, and a buffer timer 216. Table 2 includes example data that can be included within QoS matrix 212. Table 2 includes columns of data for load balance thresholds and bloc thresholds for a $1^{st}$ BC and a $2^{nd}$ BC. For purposes of this description, the $1^{st}$ BC pertains to BC10 and the $2^{nd}$ BC pertains to BC1, discussed above with respect to UE device 102 and access network 104.

QoS matrix 212 can include a respective data record for each customer type arranged to communicate with BTS 118. In Table 2, the data in each row after the first row represents data in respective data records. Each of those data records pertains to a respective QoS priority value.

TABLE 2

| Customer Type | QoS Priority Value | Voice or 1× Data | 1ˢᵗ BC Load Balance Thresh. | 1ˢᵗ BC Block Thresh. | 2ⁿᵈ BC Load Balance Thresh. | 2ⁿᵈ BC Block Thresh. | QoS Buffer Timer |
|---|---|---|---|---|---|---|---|
| Postpaid SV-LTE (1) | 1 | Voice, 9.6 kbps | 95% | 98% | 25% | 98% | 60 ms |
| Postpaid SV-LTE (2) | 2 | Voice, 9.6 kbps | 90% | 95% | 30% | 98% | 60 ms |
| Postpaid SV-LTE (3) | 3 | Voice, 9.6 kbps | 85% | 92% | 35% | 96% | 55 ms |
| Postpaid non (SV-LTE) (1) | 4 | Voice, 9.6 kbps | 80% | 90% | 40% | 95% | 50 ms |
| Postpaid non (SV-LTE) (2) | 5 | Voice, 9.6 kbps | 75% | 85% | 45% | 95% | 50 ms |
| Postpaid non (SV-LTE) (3) | 6 | Voice, 9.6 kbps | 70% | 80% | 50% | 90% | 45 ms |
| Post-paid Machine to Machine (1) | 7 | Voice, 9.6 kbps | 65% | 75% | 55% | 88% | 40 ms |
| Post-paid Machine to Machine (2) | 8 | Voice, 9.6 kbps | 60% | 75% | 60% | 86% | 40 ms |
| Pre-paid Machine to Machine | 9 | Voice, 9.6 kbps | 55% | 70% | 65% | 86% | 40 ms |
| Pre-paid SV-LTE (1) | 10 | Voice, 9.6 kbps | 50% | 65% | 70% | 85% | 35 ms |
| Pre-paid SV-LTE (2) | 11 | Voice, 9.6 kbps | 45% | 60% | 75% | 85% | 35 ms |
| Pre-paid non-SV-LTE (1) | 12 | Voice, 9.6 kbps | 40% | 60% | 80% | 85% | 30 ms |
| Pre-paid non-SV-LTE (2) | 13 | Voice, 9.6 kbps | 35% | 50% | 85% | 85% | 25 ms |
| Wholesale (1) | 14 | Voice, 9.6 kbps | 30% | 45% | 90% | 85% | 25 ms |
| Wholesale (2) | 15 | Voice, 9.6 kbps | 25% | 40% | 95% | 85% | 20 ms |
| Data Adjustment | 16-22 | V/D | N.A. | N.A. | N.A. | N.A. | N.A. |
| Reserved for ARPU and corporate discount | 23-32 | N.A. | N.A. | N.A. | N.A. | N.A. | N.A. |

In Table 2, "SV-LTE" represents "simultaneous voice—long term evolution," "ARPU" represents "average revenue per user," "kbps" represents "kilobits per second," "ms" represents "milliseconds," "N.A." represents "non-applicable," "thresh" represents "threshold," and "V/D" represents "voice/data." In Table 2, the lower the QoS priority value the higher the priority, and the higher the QoS priority value the lower the priority. The numbers within parenthesis in Table 2 indicate levels of priority for common-named customer types. Customer types associated with greater customer-type priority level number have lower priority than any common-named customer type associated with a customer-type priority level number less than that greater priority level number.

AN resource data 214 can include data WSS device 200 can use to determine whether access network 104 has sufficient resources to handle each new call requested to be handled via access network 104. WSS device 200 can be arranged to measure or determine the data stored within AN resource data 214. As an example, AN resource data 214 can comprise data indicating, for each UE device operating within a coverage area provided by access network 104, (i) an average forward power (AvgFP) usage value, (ii) a required forward power (ReqFP) value for a requested call or an ongoing call, (iii) an average noise rise (AvgNR) caused by each UE device during a call, (iv) a predicted, then measured noise rise (MsNR) caused by each UE device, (v) a predicted, then measured current voice activity factor (MsVAF) of each UE device, (vi) a predicted, then measured softer and soft handoff factor (MsSSHOf) of each UE device, (vii) an average reverse link EbNo (AvgEbNo) per UE device, and (viii) a predicted, then measured reverse link EbNo (MsEbNo). EbNo represents an energy per bit to noise power spectral density ratio.

Buffer timer 216 (for example, one or more buffer timers) can be implemented using CRPI 210. Each buffer time can be triggered as described in other parts of this description. Each buffer timer 216 may count an amount of time equal to a QoS buffer time (for example, a maximum wait time) shown in Table 2. Upon expiration of a buffer timer 216, processor 202 can execute program instructions within CRPI 210 to cause a call request for UE device 102 to be blocked.

CRPI 210 can comprise a plurality of computer-readable program instructions executable by processor 202. As an example, CRPI 210 can comprise program instructions executable to perform one or more functions shown in FIG. 3, FIG. 4 or FIG. 5. As another example, CRPI 210 can comprise program instructions executable to determine whether resources for each band class supported by access network 104 are available to handle additional calls.

As yet another example, CRPI 210 can comprise program instructions executable to modify data within QoS matrix 212. Modifying the data with QoS matrix 212 can include adding a new data record for a new customer type. Each data record within QoS matrix 212 can include data for each column shown in Table 2. Modifying the data within QoS matrix 212 can include switching the QoS priority values for two customer types. Modifying the data with QoS matrix 212 can include increasing or decreasing the thresholds for a data record. For example, when calls for UE devices with a given QoS priority value are blocked, thresholds for QoS priority values with lower priority can be lowered so that new call requests for UE devices with lower priority QoS priority values are more likely to be blocked, which may lead to new call requests for UE devices with higher priority QoS priority values to be granted. As another example, when resources are provided to UE device 102 for a granted call request, processor 102 can execute CRPI 210 to reduce, within QoS matrix 212, a load threshold or a blocking threshold associated with a QoS priority value having greater priority than the QoS priority value determined for the granted call request.

As yet another example, CRPI 210 can comprise program instructions executable to determine that resources to assign to UE device 102 to grant a new call request are available or unavailable. CRPI 210 can also comprise program instructions executable to determine a QoS priority value for a new call request and to select, based on the QoS priority value, a maximum wait time the device will wait before blocking the call request if resources to assign to UE device 102 to grant the call request remain unavailable during the first maximum wait time. CRPI 210 can also comprise program instructions executable to determine provision resources to UE device 102 to grant the call request if resources to grant the call request become available prior to the device waiting the first maximum wait time after receiving the call request, otherwise, if resources to grant the call request are not available prior to the device waiting the first maximum wait time after receiving the call request, then the device blocking the call request.

As yet another example, CRPI 210 can comprise program instructions to measurement parameters (such as forward power measurements requested or predicted for a UE device), determine a ratio using a measurement parameter with a threshold parameter (such as a maximum power threshold), and to compare the ratio with a load balance or blocking threshold within QoS matrix 212.

III. Example Operation

Figure 3:
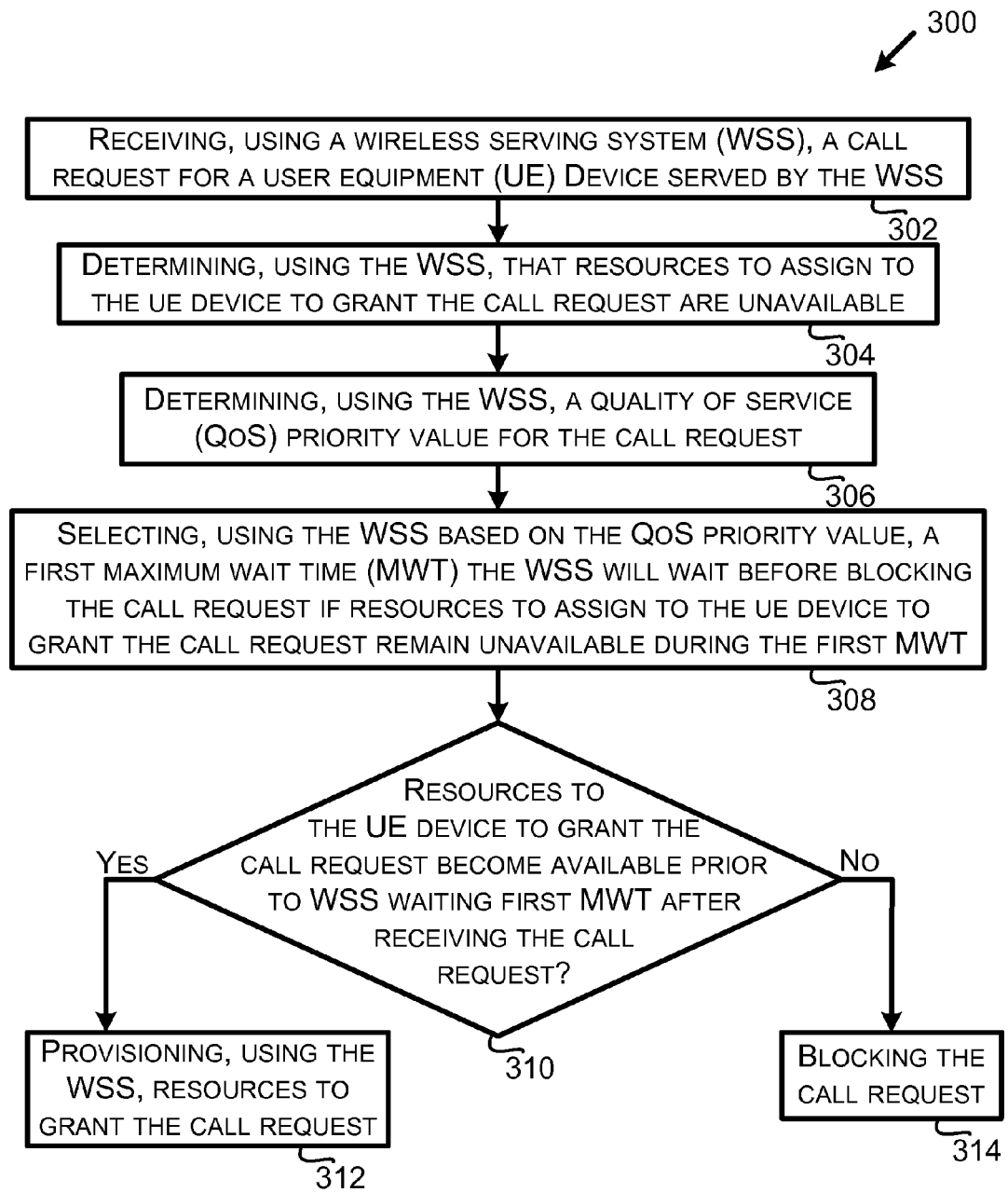
FIG. 3 is a flowchart depicting a set of functions that can be carried out in accordance with one or more example embodiments described herein.

FIG. 3 depicts a flowchart showing a set of functions 300 (or more simply, "the set 300") that can be carried out in accordance with one or more example embodiments described herein. The functions of the set 300 are shown within blocks labeled with even numbers between 302 and 314, inclusive. Each function of the set 300 can be performed by an element or a combination of elements of wireless serving system (WSS) 126. One or more of the elements carrying out at least one function of the set 300 can be arranged like WSS device 200, or any device described herein as being arranged like WSS device 200.

Block 302 includes receiving, using the WSS 126, a call request for a UE device served by the WSS 126. For purposes of describing FIG. 3, that UE device is referred to as UE device 102. WSS 126 can receive the request from the UE device 102, from another UE device served by WSS 126, or from a device within another network such as PSTN 110, IP network 116, or another wireless serving system. The call request can be for a voice or data call with UE device 102. By way of example, the call request can be for a voice call initiated at UE device 102, a voice call initiated by a land-line telephone connected to PSTN 110, or a voice call initiated by a voice over interne protocol (VoIP) telephone connected to IP network 116. By way of another example, the call request can be for a data call initiated by UE device 102 to search the World Wide Web of IP network 116.

Block 304 includes determining, using the WSS 126, that resources to assign to the UE device 102 to grant the call request are unavailable. For example, WSS device 200 can refer to AN resource status data 214 to determine whether or not resources to grant the call request are unavailable. Determining whether sufficient resources for the call are available can include determining the type of call requested or a data rate requested for the requested call so as to determine an amount of resources that would be used if the call request is granted.

If, at block 304, the WSS 126 alternatively determines that resources to grant the call request are available, then WSS 126 can assign the resources to UE device 102 to carry out a new call in response to the call request.

Block 306 includes determining, using the WSS 126, a QoS priority value for the call request. Determining the QoS priority value can depend on any one or more factors associated with the call request. For example, the factors associated with the call request can include a customer type associated with UE device 102, a base data rate for a call, a requested data rate for the call, and whether the call request is for a voice call or a data call. A default QoS priority value can be stored with QoS matrix 212 or elsewhere within WSS 126. Additionally or alternatively, determining a QoS priority value can include a device within WSS 126, such as WSS device 200, receiving, from HLR 108, a message, such as a registration message, that includes a default QoS priority value assigned to UE device 102.

Processor 202 can execute program instructions within CRPI 210 to determine the default QoS priority value for UE device 212 and the type of call requested. If the requested call with UE device 102 is a voice call, determining the QoS priority value at block 306 can include using the default QoS priority value as the QoS priority value for the new call. If the requested call with UE device 102 is a data call, determining the QoS priority value at block 306 can include processor executing program instructions within CRPI 210 to solve an equation, such as Equation 1, to determine the QoS priority value.

$$\text{QoS PV} = \text{Default PV for UE Device} + (\text{Requested DR/Base DR} + 1). \quad \text{Equation 1:}$$

In Equation 1, "PV" represents "priority value" and "DR" represents "data rate." Processor 202 may execute CRPI 210 to solve equation 1 for data call requests. For example, for a call request to use a UE device having a customer type referred to as postpaid SV-LTE (1) in Table 2, a requested data rate of 38.4 kbps, and a base data rate of 9.6 kbps, the QoS priority value for the call request based on Equation 1 equals 1+(38.4 kbps/9.6 kbps−1)=1+3=4. Thus, for that example call request, the priority value for the call request is 4 which is the same priority value for voice calls and data calls at 9.6 kbps using UE devices having customer type of "Postpaid non (SV-LTE)(1)" In accordance with or more example embodiments, QoS priority values for voice calls equivalent to QoS priority values for data calls can be given priority over the data calls with the equivalent QoS priority values.

Block 308 includes selecting, using the WSS 126 based on the QoS priority value, a first maximum wait time (MWT) the WSS 126 will wait before blocking the call request if resources to assign to the UE device 102 to grant the call request remain unavailable during the first MWT. Processor 202 can execute CRPI 210 to select the QoS buffer timer from within QoS matrix 212 for the QoS record having the priority value that matches the priority value determined at block 306. Processor 202 can execute CRPI 210 to trigger buffer timer 216 to count the first MWT.

Block 310 includes determining whether resources to UE device 102 to grant the call request become available prior to the WSS 126 waiting the first MWT after receiving the call request. As an example, WSS device 200 can refer to AN resource status data 214 to determine whether or not resources to grant the call request become available while buffer timer 216 is counting to the first MWT.

Block 312 includes provisioning, using the WSS 126, resources to grant the call request. Provisioning the resources at block 312 can occur in response to WSS 126 determining resources to grant the call request become available at block 310.

Block 314 includes blocking the call request. Blocking the call request at block 314 can occur in response to WSS 126 or WSS device 210 determining resources to grant the call request do not become available at block 310 by the time buffer timer 216 counted the first MWT.

Figure 4:
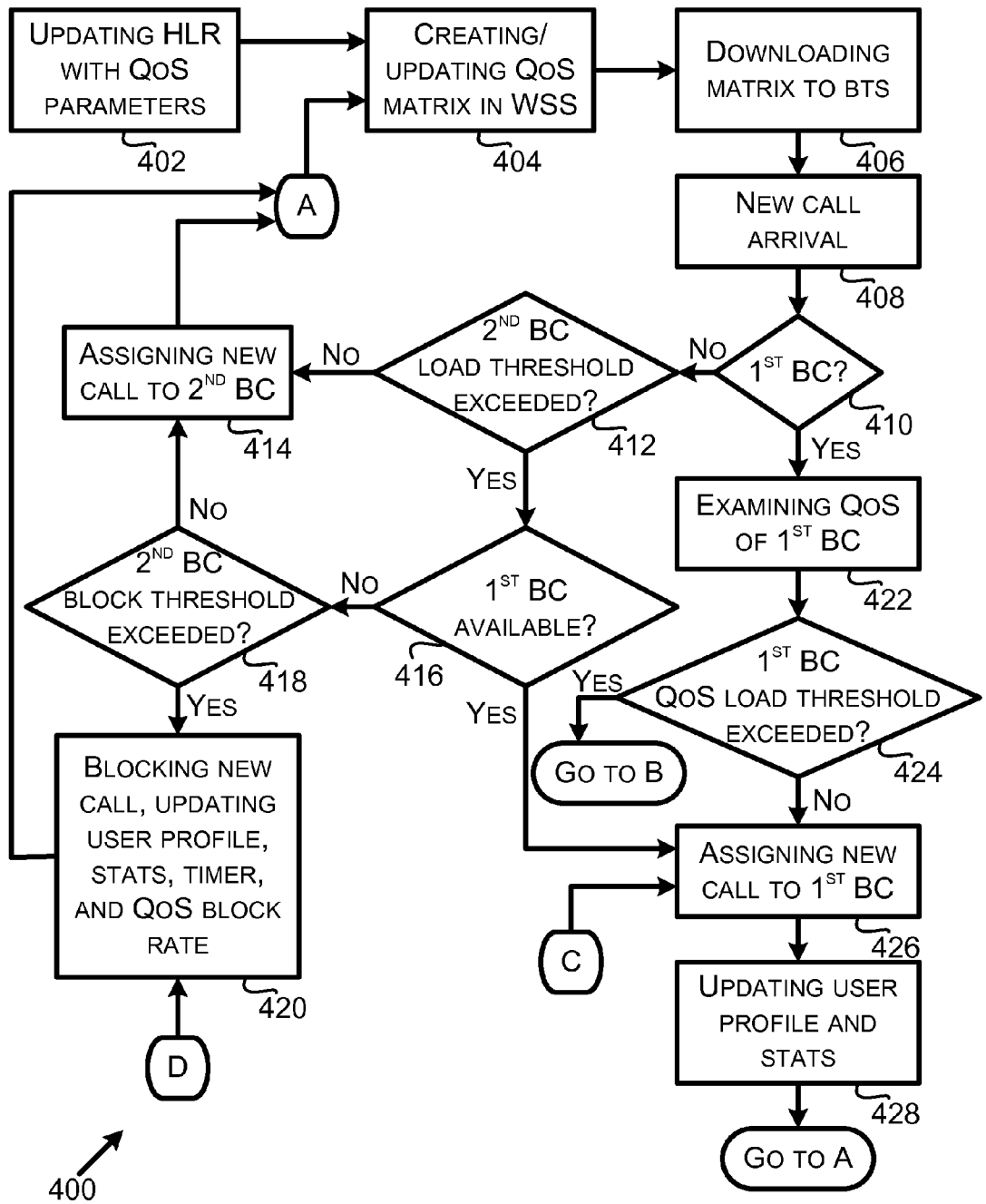
FIG. 4 is a flowchart depicting another set of functions that can be carried out in accordance with one or more example embodiments described herein.
Figure 5:
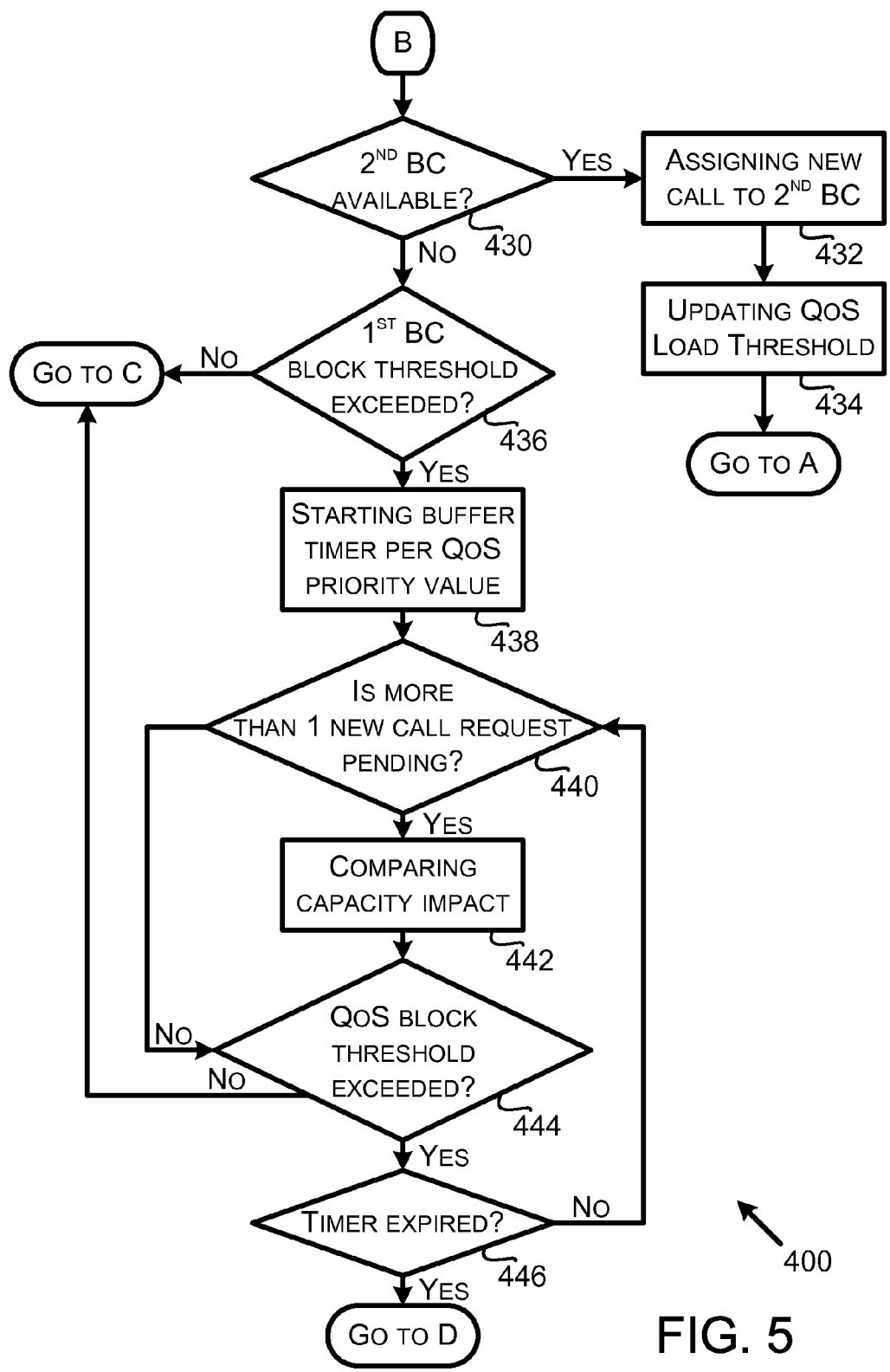
FIG. 5 is a flowchart depicting another set of functions that can be carried out in accordance with one or more example embodiments described herein.

FIG. 4 and FIG. 5 depict a flowchart showing a set of functions 400 (or more simply, "the set 400") that can be carried out in accordance with one or more of the example embodiments described herein. The functions of the set 400 are shown within blocks labeled with even numbers between 402 and 444, inclusive. Each function of the set 400 can be performed by an element or a combination of elements of wireless serving system (WSS) 126 or by WSS device 200. The set 400 refers to a $1^{st}$ BC and a $2^{nd}$ BC. For purposes of this description, the $1^{st}$ BC represents BC10 and the $2^{nd}$ BC represents BC1. Other examples of the $1^{st}$ BC and the $2^{nd}$ BC are also possible.

Block 402 includes updating HLR 108 with QoS parameters. The QoS parameters can comprise any parameters storable within QoS matrix 212 or some other parameter. Updating HLR 108 can include providing HLR 108 with an initial set of QoS parameters for use in creating or adding to QoS matrix 212 or QoS parameters to modify QoS matrix 212.

Block 404 includes creating or updating QoS matrix 212 in WSS 126. Creating QoS matrix 212 can include creating a single instance of QoS matrix within WSS 126. Alternatively, creating QoS matrix 212 can include creating a single instance of QoS matrix within two or more elements of WSS 126. For example, a QoS matrix can be created in MSC 106 or BSC 120 and a separate QoS matrix can be created in each of one or more BTS 118. One QoS matrix can be considered a master matrix that is updated to include one or more new QoS parameters. Changes made to master QoS matrix can be communicated to each other QoS matrix for updating each other QoS matrix to match the master QoS matrix.

Block 406 includes downloading QoS matrix 212 to BTS 118 (i.e., one or more BTS). Downloading QoS matrix 212 can occur wirelessly, such as over a microwave air interface between BTS 118 and MSC 106 or BSC 120. Alternatively, downloading QoS matrix 212 can occur via a wired communication link, such as a fiber or copper link between BTS 118 and MSC 106 or BSC 120.

Block 408 includes a new call arriving at WSS 126. The new call arriving at WSS 126 can be in the form of a new call request. In one respect, the new call can be a call placed to (for example, destined for) UE device 102 from a network external to WSS 126, such as PSTN 110 or IP network 116. In another respect, the new call can be a call placed, from UE device 102, to a device within the network external to WSS 126. In yet another respect, the new call can be a call placed between two UE devices communicating via WSS 126. The new call can be arranged as a page request to establish the new call using resources of access network 104.

Block 410 includes determining whether the new call is for the $1^{st}$ BC. An element of WSS 126 can make the determination at block 410, for example, by referring to HLR 108 based on data contained in the new call, a request to establish the new call (e.g., a page message) or by referring to a registration message, such as an IS-41 registration message, regarding UE device 102. Other examples of how an element of WSS 126 makes the determination of block 410 are also possible.

Block 412 includes determining whether the load threshold for the $2^{nd}$ BC is exceeded. An element of WSS 126 can make the determination at block 412 in response to determining, at block 410, that the new call is not for the $1^{st}$ BC. Making the determination at block 412 can include the element of WSS 126 determining a customer type associated with UE device 102, determining, from QoS matrix 212, the load threshold for the $2^{nd}$ BC that matches the customer type associated with UE device 102, and determining a loading measurement of the $2^{nd}$ BC.

Making the determination at block 412 can include the element of WSS 126 comparing the loading measurement of the $2^{nd}$ BC to the load threshold determined from QoS matrix 212. The loading measurement can be a measurement of actual or projected forward power used by UE device 102, a measurement of actual or projected reverse noise rise caused by UE device 102 or some other measurement. Similar loading measurements can be made for other functions that include determining whether a load or blocking threshold is exceeded.

Additionally or alternatively, making the determination at block 412 can include determining a ratio of the measurement and a threshold level, and comparing the ratio to the load threshold determined from the QoS matrix 212. As an example, the measurement can comprise a measurement of forward power and the threshold level can be an indication of maximum power available for traffic communications by WSS 126. The measurement of forward power and the indication of maximum power can be listed in Watts or some other type of units.

Block 414 includes assigning the new call to the $2^{nd}$ BC. Assigning the new call to the $2^{nd}$ BC can include reserving resources of the $2^{nd}$ BC and assigning those reserved resources of the $2^{nd}$ BC for use by UE device 102 to carry out the new call. Assigning the new call to the $2^{nd}$ BC, at block 414, can occur under various circumstances. As an example, those circumstances can include determining that the QoS load threshold for the $2^{nd}$ BC is not exceeded at block 412 or determining that the block threshold for the $2^{nd}$ BC is not exceeded at block 420. While or after assigning the new call to the $2^{nd}$ BC at block 414, the example method can proceed to block 404.

Block 416 includes determining whether the $1^{st}$ BC is available. An element of WSS 126 can make the determination at block 416 in response to determining that the load threshold for the $2^{nd}$ BC is exceeded at block 412. As an example, determining that the $1^{st}$ BC is available can include WSS 126 determining that resources of BTS 118 for carrying out communication using the $1^{st}$ BC are available for carrying out the new call.

Block 418 includes determining that the block threshold for the $2^{nd}$ BC is exceeded. An element of WSS 126 can make the determination at block 418 in response to determining, at block 416, that the $1^{st}$ BC is not available for the new call. Making the determination at block 418 can include the element of WSS 126 determining the customer type associated with UE device 102, determining, from QoS matrix 212, the block threshold for the $2^{nd}$ BC that matches the customer type associated with UE device 102, and determining the loading measurement of the $2^{nd}$ BC. Making the determination at block 418 can include the element of WSS 126 comparing the loading measurement of the $2^{nd}$ BC to the block threshold determined from QoS matrix 212.

Block 420 includes blocking the new call and updating a user profile, statistics, QoS timer, and QoS block rate. An element of WSS 126 can block the new call so as to prevent the new call from being completed. An element of WSS 126 can update the user profile, statistics, QoS time and QoS block rate. Since blocking of the new call has occurred, rates (e.g., blocking rates) at which each customer type has occurred can be compared. If that comparison indicates calls for higher-priority customer types are being blocked more than calls for lower-priority customer types, then WSS 126 can alter blocking rates for the customer types so that future new calls are less likely to be blocked for the calls for higher-priority customer types as compared to the new calls for lower-priority customer types. Furthermore, WSS 126 can track a quantity of calls blocked and a quantity of calls successfully assigned to a band class for each UE device. If blocking the new call results in excessive blocking of calls for the UE device, then a higher priority QoS priority value can be used for that UE device. An excessive blocking rate can be associated with each QoS priority value within QoS matrix 212. Blocking the new call and performing the updates at block 420 can be carried in response to determining, at block 418, that the block threshold for the $2^{nd}$ BC is exceeded.

Block 422 includes examining the QoS of the $1^{st}$ BC. Examining QoS of the $1^{st}$ BC can comprise determining a loading measurement or parameters that indicate a QoS of the $1^{st}$ BC. As an example, the loading measurements or parameters can comprise a parameter indicating a percentage of forward-link power in use, a parameter indicating a reverse-noise rise present on reverse links of the $1^{st}$ BC, a parameter indicating a percentage of the $1^{st}$ BC capacity in use or available for use. Examining the QoS of the $1^{st}$ BC at block 422 can be carried out after or in response to determining, at block 410, that the new call is for the $1^{st}$ BC.

Block 424 includes determining whether the QoS load threshold for the $1^{st}$ BC is exceeded. An element of WSS 126 can make the determination at block 424 based on the examination of the QoS of the $1^{st}$ BC. Making the determination at block 424 can include an element of WSS 126 determining a customer type associated with UE device 102, determining, from QoS matrix 212, the load threshold for the $1^{st}$ BC that matches the customer type associated with UE device 102, and determining a loading measurement of the $1^{st}$ BC. Making the determination at block 424 can include the element of WSS 126 comparing the loading measurement of the $1^{st}$ BC to the load threshold for the $1^{st}$ BC determined from QoS matrix 212. For purposes of this description, the QoS load threshold being exceeded can include the loading measurement being equal to the load threshold.

Block 426 includes assigning the new call to the $1^{st}$ BC. Assigning the new call to the $1^{st}$ BC can include reserving resources of the $1^{st}$ BC and assigning those reserved resources of the $1^{st}$ BC for use by UE device 102 to carry out the new call. Assigning the new call to the $1^{st}$ BC, at block 426, can occur under several circumstances. As an example, those circumstances can include determining that the first band class is available at block 416, determining that the QoS load threshold for the first band class is exceeded at block 424, or determining that the block threshold for the first band class is not exceeded at block 436.

Block 428 includes updating user profile and statistics. Performing the update at block 428 can occur in response to assigning the new call to the $1^{st}$ BC at block 428. Since assignment of the new call has occurred, a user profile can be updated to indicate the maximum power used, a frame error rate, an individual noise rise, a drop rate, and a block rate so as to determine what expected power usage, call quality, or some other factor may impact the success of assigning a new call to that UE device in subsequent blocking conditions.

Block 430 includes determining whether the $2^{nd}$ BC is available. Making the determination at block 430 can occur after or in response to determining, at block 424, that the QoS load threshold of the $1^{st}$ BC is exceeded. WSS device 200 can refer to AN resource status data 214 to determine whether the $2^{nd}$ BC is available.

Block 432 includes assigning the new call to the $2^{nd}$ BC. Assigning the new call to the $2^{nd}$ BC can include reserving resources of the $2^{nd}$ BC and assigning those reserved resources of the $2^{nd}$ BC for use by UE device 102 to carry out the new call. Assigning the new call to the $2^{nd}$ BC at block 432 can occur in response to making the determination, at block 430, that the $2^{nd}$ BC is available.

Block 434 includes updating QoS load threshold (e.g., one or more QoS load thresholds). Updating the QoS load threshold can occur in response to assigning the new call to the $2^{nd}$ BC at block 432. An element of WSS 126 can update the QoS load threshold within QoS matrix 212. Updating the QoS load threshold at block 434 can comprise reducing each $1^{st}$ BC QoS load threshold associated with a QoS priority value that has lower priority that the UE device 102 engaging in the new call. For example, if the UE device 102 engaging in the new call is associated with a $1^{st}$ BC QoS priority value of 4, then the $1^{st}$ BC QoS load thresholds having priority (i.e., $1^{st}$ BC QoS priority values>4) are reduced (e.g., by 5%). In accordance with that example and the example $1^{st}$ BC QoS load thresholds shown in Table 2, the updated QoS load thresholds for priority values 5 through 15 would be 70%, 65%, 60%, 55%, 50%, 45%, 40%, 35%, 30%, 25%, and 20%. Updating the QoS load threshold can also include reducing the $1^{st}$ BC QoS load threshold associated with the $1^{st}$ BC QoS priority value of 4 (e.g., by 5% from 80% to 75%).

Block 436 includes determining whether the load threshold for the $1^{st}$ BC is exceeded. An element of WSS 126 can make the determination at block 436 in response to determining, at block 430, that the $2^{nd}$ BC is not available. Making the determination at block 436 can include the element of WSS 126 determining a customer type associated with UE device 102, determining, from QoS matrix 212, the load threshold for the $1^{st}$ BC that matches the customer type associated with UE device 102, and determining a loading measurement of the $1^{st}$ BC. Making the determination at block 436 can include the element of WSS 126 comparing the loading measurement of the $1^{st}$ BC to the load threshold determined from QoS matrix 212.

Block 438 includes starting buffer timer 216 per QoS type. An element of WSS 126 can start the buffer timer 216. That element of WSS 126 can refer to QoS matrix 212 to determine the time duration to use when using the buffer timer 216 associated with the QoS priority value assigned to the UE device 102 for the new call. Starting buffer timer 216 can occur in response to making the determination, at block 436, that the $1^{st}$ BC block threshold is exceeded.

Block 440 includes determining whether more than one new call request is pending. The determination of block 440 can occur for each RF sector provided by BTS 118. If the new call request discussed with respect to block 408 is the only new call request pending for a given RF sector provided by BTS 118, then the example method can continue at block 444. Otherwise, if more than one new call request is pending for the given RF sector provided by BTS 118, then the example method can continue at block 442.

Block 442 includes comparing a capacity impact. The capacity impact comparison of block 442 can be carried out when two or more requests for new calls are currently pending (i.e., waiting for WSS 126 to determine whether to grant or block new call request). For example, the two or more requests can include a first new call request for the new call arriving at block 408 and a second new call request. The comparison of block 442 can include comparing the impact the first new call request would have on the QoS provided by WSS 126 if the first new call request is granted versus the impact the second new call request would have on the QoS provided by WSS 126 if the second new call request is granted. A result of making the comparison of block 442 can be WSS 126 determining which new call request of the two or more new call requests would be less detrimental to the QoS provided by WSS 126.

Comparing the capacity impact can comprise comparing various data (e.g., comparison values) pertaining to each new call request. As an example, comparing the capacity impact can comprise comparing a data parameter or ratio of data parameters associated with the UE devices for which the two or new call requests are pending. Those data parameters can be stored within AN resource status data 214, such as AvgFP, ReqFP, AvgNR, MsNR, MsVAF, MsSSHOf, AvgEbNo, or MsEbNo. As another example, the ratio of data parameters can comprise ratios such as AvgFP/ReqFP, AvgNR/MsNR, or AvgEbNo/MsEbNo.

As yet another example, processor 202 can execute CRPI 210 configured to solve an equation, such as Equation 2 or Equation 3, for each UE device and compare the QoS determined by solving those equations to compare the capacity impact. Processor 202 can determine a radio configuration (RC) for each UE device with a pending call request. Equation 2 can be used for UE devices having RC3, RC8 or RC11. Equation 3 can be used for UE devices having RC 4. Equations 2 or 3 can be used for other RC as well and other equations to determine a QoS for a UE device are also possible.

$$QoS = (ARPU/CorDis) \times (9,600/DtRtAsgn) \times (AvgFP/ReqFP) \times (AvgNR/MsNR) \times (1/MsSSHOf) \times (1/MsVAF) \times (AvgEbNo/MsEbNo) \quad \text{Equation 2:}$$

$$QoS = (ARPU/CorDis) \times (9,600/DtRtAsgn) \times (AvgFP/ReqFP) \times (AvgNR/MsNR) \times (1/MsSSHOf) \times (1/MsVAF) \times (AvgEbNo/MsEbNo) \times 1.35 \quad \text{Equation 3:}$$

In another respect, the comparing function at block 442 can include determining a first QoS comparison value pertaining to the new call request for UE device 102, comparing the first QoS comparison value to at least one other comparison QoS value. Each comparison QoS value of the at least one other comparison QoS value is determined for a respective new call requested with a respective UE device, such as UE device 128, still awaiting to be assigned to the first band class or being blocked. The comparing function can include determining that additional resources of the first band class, assignable for a new call, become available prior to expiration of the first buffer time and assigning the additional resources of the first band class to the first UE device if comparing the first QoS comparison value to the at least one other comparison QoS value indicates the first UE device will impact QoS provided by the first band class less than any of any UE device still awaiting to be assigned to the first band class or being blocked.

In situations in which only a single call request is pending, comparing capacity impact at block 442 can be postponed until multiple call requests are pending.

Block 444 includes making a determination of whether a QoS block threshold is exceeded. An element of WSS 126, such as MSC 106, BTS 118, or BSC 120, can make the determination at block 444. If the only new call request pending for the RF sector of the BTS serving UE device 102 is the request for the new call arriving at block 408, then the determination at block 444 includes determining whether the block threshold determined for UE device 102 is exceeded. If multiple new call requests are pending for the RF sector of the BTS serving UE device 102 is the request for the new call arriving at block 408, then the determination at block 444 can include determining whether the block threshold determined for UE device that will be less detrimental to QoS provided for that RF sector is exceeded.

Block 446 includes determining whether buffer timer 216 has expired. An element of WSS 126, such as MSC 106, BTS 118, or BSC 120, can make the determination at block 446.

In accordance with the example embodiments in which the buffer timer 216 was started for UE device 102 and the buffer timer 216 expires before the new call request for UE device 102 is granted, the example method with respect to the new call request for UE device 102 can proceed to block 422 shown in FIG. 4. Upon expiration of buffer timer 216 for UE device 102, buffer timers for other new call requests that have not yet expired can continue to run until expiration or until the other new call requests are granted.

In accordance with the example embodiments in which the buffer timer 216 was started for a UE device other that UE device 102, such as UE device 126, and the buffer timer 216 for UE device 126 expires before the new call request for UE device 126 is granted, the example method with respect to the new call request for UE device 126 can proceed to block 422 shown in FIG. 4.

IV. Conclusion

Example embodiments have been described above. Those skilled in the art will understand that changes and modifications can be made to the described embodiments without departing from the true scope and spirit of the present invention, which is defined by the claims.

We claim:

1. A method comprising:
receiving, using a wireless serving system (WSS), a call request for a user equipment (UE) device served by the WSS;
determining, using the WSS, that resources to assign to the UE device to grant the call request are unavailable;
determining, using the WSS, a quality of service (QoS) priority value for the call request;
selecting, using the WSS based on the QoS priority value, a first maximum wait time the WSS will wait before blocking the call request if resources to assign to the UE device to grant the call request remain unavailable during the first maximum wait time; and
provisioning, using the WSS, resources to the UE device to grant the call request if resources to grant the call request become available prior to the WSS waiting the first maximum wait time after receiving the call request, otherwise, if resources to grant the call request are not available prior to the WSS waiting the first maximum wait time after receiving the call request, then the WSS blocking the call request.

2. The method of claim 1, further comprising:
determining, using the WSS, a default QoS priority value assigned to the UE device; and
determining, using the WSS, whether the call request is for a voice call or a data call,
wherein, if the WSS determines the call request is for a voice call, then determining the QoS priority value for the call request comprises using the default QoS priority value as the QoS priority value for the call, and wherein, if the WSS determines that call request is for a data call, then the WSS determines the QoS priority value for the call request based on the default QoS priority value, a base data rate, and a requested data rate for the call request.

3. The method of claim 2, further comprising:
receiving, from a home location register, a registration message comprising data indicating the default QoS priority value assigned to the UE device,
wherein the WSS determines the default QoS priority value from the registration message.

4. The method of claim 1, further comprising:
storing, within a data storage device of the WSS, a QoS matrix comprising a plurality of QoS records,
wherein each QoS record pertains to a respective QoS priority value,
wherein each QoS record indicates a selectable maximum wait time, and
wherein selecting the first maximum wait time comprises selecting the selectable maximum wait time indicated by the QoS record that pertains to a QoS priority value that matches the QoS priority value for the call request.

5. The method of claim 4,
wherein the QoS matrix comprises a first QoS data record, and
wherein each QoS record comprises a respective first load balance threshold and a respective first blocking threshold;
the method further comprising:
modifying, within the data storage device of the WSS, at least one of the first load balance threshold and the first blocking threshold of the first QoS data record.

6. A device of a wireless serving system (WSS), the device comprising:
a communication interface arranged to receive a call request for a user equipment (UE) device served by the WSS;
a processor; and
a non-transitory computer-readable data storage device comprising computer-readable program instructions executable by the processor,
wherein the computer-readable program instructions comprise program instructions executable to (i) determine that resources to assign to the UE device to grant the call request are unavailable, (ii) determine a first quality of service (QoS) priority value for the call request, (iii) select, based on the first QoS priority value, a first maximum wait time the device will wait before blocking the call request if resources to assign to the UE device to grant the call request remain unavailable during the first maximum wait time, and (iv) provision resources to the UE device to grant the call request if resources to grant the call request become available prior to the device waiting the first maximum wait time after receiving the call request, otherwise, if resources to grant the call request are not available prior to the device waiting the first maximum wait time after receiving the call request, then the device blocking the call request.

7. The device of claim 6,
wherein the processor is arranged to access a QoS matrix comprising a plurality of QoS records,
wherein each QoS, record pertains to a respective QoS priority value,
wherein each QoS record indicates a selectable maximum wait time, and
wherein selecting the first maximum wait time comprises selecting the selectable maximum wait time indicated by the QoS record that pertains to a QoS priority value that matches the first QoS priority value for the call request.

8. The device of claim 6,
wherein the computer-readable data storage device further comprises a buffer timer arranged to count the first maximum wait time, and
wherein the processor has access to access node resource status data from which the processor, by executing the computer-readable program instructions, can determine if resources to grant the call request become available.

9. The device of claim 6,
wherein the processor is arranged to access a QoS matrix comprising a plurality of QoS records,
wherein each QoS record pertains to a respective QoS priority value,
wherein, if the device blocks the call request, the processor then executes computer-readable program instructions to reduce, within the QoS matrix, a load threshold or a blocking threshold associated with a QoS priority value having lower priority than the first QoS priority value, and
wherein, if the device provisions resources to the UE device to grant the call request, the processor then executes computer-readable program instructions to reduce, within the QoS matrix, a load threshold or a blocking threshold associated with a QoS priority value having greater priority than the first QoS priority value.

10. The device of claim 6, wherein the device comprises a base transceiver station, a base station controller, or a mobile switching center.

11. A method comprising:
determining, using a wireless serving system (WSS), a first new call for a multi-band user equipment (UE) device using a first band class is requested;
selecting, using the WSS, a first quality of service (QoS) load threshold and a first QoS blocking threshold to use with respect to assigning or blocking the first new call;
determining, using the WSS, whether a loading of the first band class exceeds the first QoS load threshold, wherein if the WSS determines the loading of the first band class does not exceed the first QoS load threshold, then assigning the first new call to the first band class;
determining, using the WSS if the WSS determines the loading of the first band class exceeds the first QoS load threshold, whether a second band class usable by the UE device is available for carrying out the first new call, wherein if the WSS determines the second band class is available for carrying out the first new call, then assigning the first new call to the second band class;
determining, using the WSS if the WSS determines the second band class is not available for carrying out the first new call, whether the loading of the first band class exceeds the first QoS blocking threshold, wherein if the WSS determines the loading of the first band class does not exceed the first QoS blocking threshold, then assigning the first new call to the first band class;
starting, using the WSS if the WSS determines the loading of the first band class exceeds the first QoS blocking threshold, a buffer timer; and
blocking, using the WSS, the first new call if the buffer timer expires prior to the WSS assigning the first new call to the first band class or the second band class.

12. The method of claim 11, further comprising:
storing, within a non-transitory computer-readable data storage device of the WSS, a QoS matrix,
wherein selecting the first QoS load threshold and the first QoS blocking threshold comprises selecting the first QoS load threshold and the first QoS blocking threshold from the QoS matrix based on the first band class and a first QoS priority value.

13. The method of claim 12, wherein, if the WSS blocks the first new call, the method further comprises:
modifying, within the QoS matrix using the WSS, a load threshold or a blocking threshold associated with a QoS priority value having lower priority than the first QoS priority value.

14. The method of claim 12,
wherein, if the WSS blocks the first new call, the method further comprises:
modifying, within the QoS matrix using the WSS, a load threshold or a blocking threshold associated with a QoS priority value having lower priority than the first QoS priority value.

15. The method of claim 11, further comprising:
determining a first QoS comparison value pertaining to the first new call;
comparing the first QoS comparison value to at least one other comparison QoS value, wherein each comparison QoS value of the at least one other comparison QoS value is determined for a respective new call requested with a respective UE device still awaiting to be assigned to the first band class or being blocked;
determining additional resources of the first band class, assignable for a new call, become available prior to expiration of the first buffer time and assigning the additional resources of the first band class to the first UE device if comparing the first QoS comparison value to the at least one other comparison QoS value indicates the first UE device will impact QoS provided by the first band class less than any of the respective UE device still awaiting to be assigned to the first band class or being blocked.

16. The method of claim 14, further comprising:
determining, using the WSS, an average forward-link power (AvgFP) per user value;
determining, using the WSS, a required forward-link power (ReqFP) for the first UE device;
wherein determining the first QoS comparison value comprises solving an equation including a ratio of the AvgFP and the ReqFP.

17. The method of claim 14, further comprising:
determining, using the WSS, an average noise rise (AvgNR) per user value;
determining, using the WSS, a noise rise (MsNR) for the first UE device;
wherein determining the first QoS comparison value, comprises solving an equation including a ratio of the AvgNR and the MsNR.

18. The method of claim 16, wherein the MsNR is a predicted noise rise for the first UE device.

19. The method of claim 16, wherein the MsNR is a measured noise rise for the first UE device.

* * * * *